(12) United States Patent
Chase

(10) Patent No.: US 6,418,435 B1
(45) Date of Patent: *Jul. 9, 2002

(54) SYSTEM FOR QUANTIFYING INTENSITY OF CONNOTATIVE MEANING

(75) Inventor: Wayne O. Chase, Vancouver (CA)

(73) Assignee: Connotative Reference Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/372,549

(22) Filed: Aug. 11, 1999

(51) Int. Cl.[7] .............................. G06F 17/30; G06F 7/00
(52) U.S. Cl. .............................. 707/5; 704/10; 434/236; 434/169
(58) Field of Search ........................... 707/5; 704/1, 9, 704/10; 434/236, 169

(56) References Cited

U.S. PATENT DOCUMENTS

| | | | |
|---|---|---|---|
| 4,384,329 A | 5/1983 | Rosenbaum et al. | 364/300 |
| 4,712,174 A | 12/1987 | Minkler, II | 364/200 |
| 4,724,523 A | 2/1988 | Kucera | 364/419 |
| 4,914,590 A | 4/1990 | Loatman et al. | 364/419 |
| 4,931,935 A | 6/1990 | Ohira et al. | 364/419 |
| 5,153,830 A | 10/1992 | Fisher et al. | 364/419 |
| 5,200,896 A | 4/1993 | Ozawa et al. | 364/419 |
| 5,404,299 A | 4/1995 | Tsurubayashi et al. | 364/419.11 |
| 5,424,945 A * | 6/1995 | Bell | 364/419.2 |
| 5,696,981 A * | 12/1997 | Shovers | 395/760 |
| 5,708,822 A | 1/1998 | Wical | 395/751 |
| 5,781,879 A * | 7/1998 | Arnold et al. | 704/9 |
| 5,794,050 A | 8/1998 | Dahlgren et al. | 395/708 |
| 5,873,056 A * | 2/1999 | Liddy et al. | 704/9 |
| 5,918,222 A * | 6/1999 | Fukui et al. | 707/1 |
| 6,006,221 A * | 12/1999 | Liddy et al. | 77/5 |
| 6,026,388 A * | 2/2000 | Liddy et al. | 707/1 |
| 6,061,675 A * | 5/2000 | Wical | 706/45 |
| 6,202,058 B1 * | 3/2001 | Rose et al. | 706/45 |

OTHER PUBLICATIONS

Osgood, Charles E.; "On the Whys and Wherefores of E, P, and A," Journal of Personality and Social Psychology, vol. 12, No. 3, pp. 194–199, 1969.
Oskamp, Stuart; "Attitudes and Opinios," Prentice–HAll, Inc. pp. 34–48, 1977.
Ed. by Osgood et al.; "Language, Meaning and Culture," Praeger Publishers; Ch. 7, pp. 203–234; 1990.

* cited by examiner

Primary Examiner—John Breene
Assistant Examiner—Susan Rayyan
(74) Attorney, Agent, or Firm—Steven P. Koda

(57) ABSTRACT

In a distributed method of data gathering, connotative meanings of terms are selected from predefined emotional descriptors organized into a plurality of emotional categories. Respective judges select zero or one emotional descriptors from a given category and rate the term for intensity. Each term is evaluated by a plurality of judges for each emotional category. The results are processed to assure that the selected emotional descriptors were not selected by chance. Retained associations become part of a database of terms, including connotative meanings and related intensity. A self-calibration method is used during intensity evaluation to assure uniformity among intensity ratings. The judges select among anchor terms for each intensity rating in a given emotional category, picking the anchor terms which most accurately reflects the rating level being checked. The completed data base is accessed through a computer interface to implement an electronic language reference tool.

17 Claims, 7 Drawing Sheets

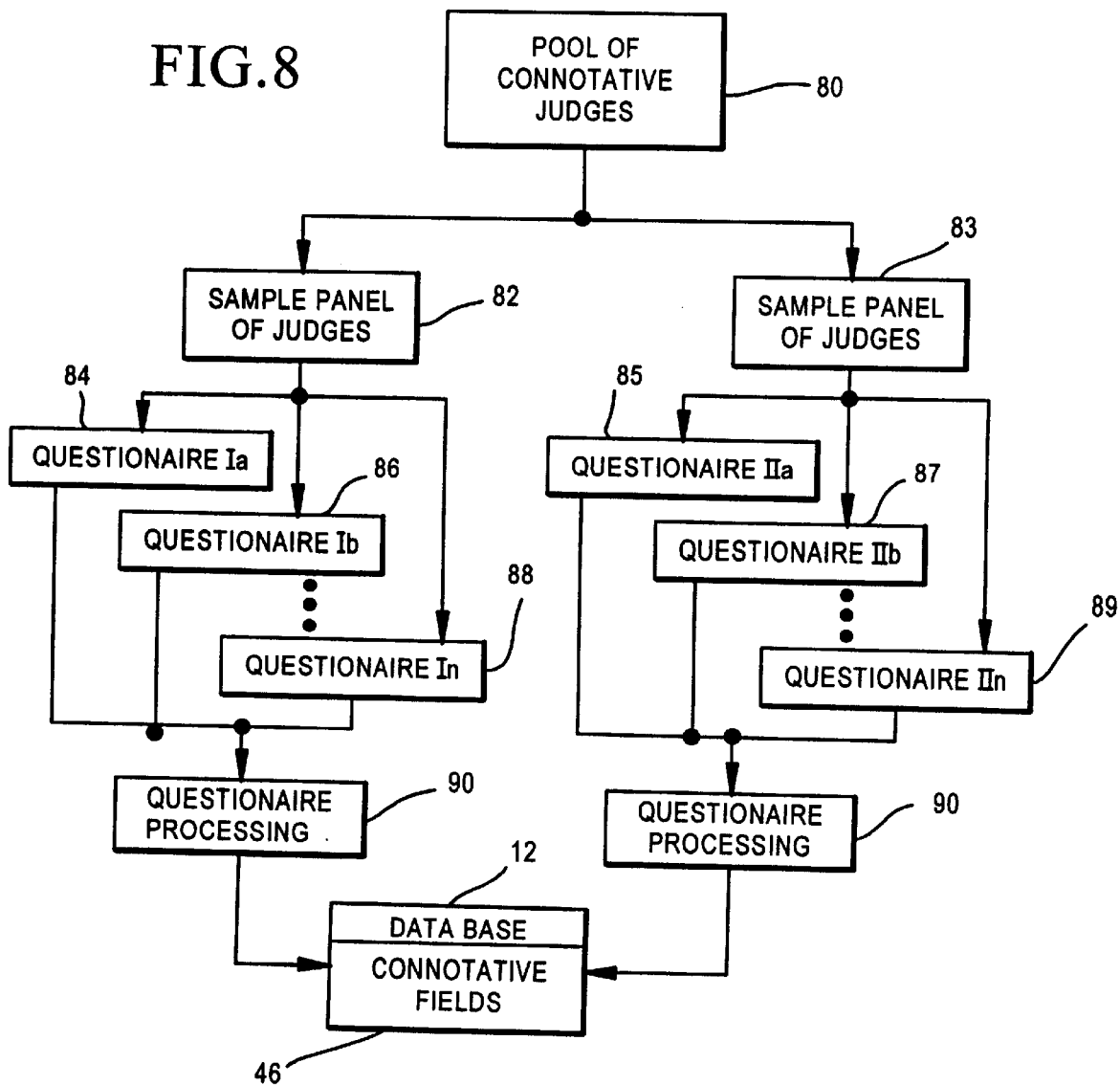

SYSTEM FOR QUANTIFYING INTENSITY OF CONNOTATIVE MEANING

CROSS REFERENCE TO RELATED APPLICATIONS

This invention is related to commonly-assigned U.S. patent application Ser. No. 09/372,377 filed on the same day, of W. Chase for "System for Identifying Connotative Meaning;" commonly-assigned U.S. patent application Ser. No. 09/372,243 filed on the same day, of W. Chase for "Interactive Connotative Dictionary System;" commonly-assigned U.S. patent application Ser. No. 09/372,244 filed on the same day, of W. Chase for "Interactive Connotative Thesaurus System;" commonly-assigned U.S. patent application Ser. No. 09/372,737 filed on the same day, of W. Chase for "System for Connotative Analysis of Discourse." The content of all such applications are incorporated herein by reference and made a part hereof.

BACKGROUND OF THE INVENTION

This invention relates to a system for quantifying the intensity of a connotative meaning, and more particularly to a system for quantifying the intensity of emotional connotations associated with various words and phrases among multiple affective dimensions.

The use of ideas, images or other symbols to stand for objects or events is called symbolic representation. In the context of human language symbolic representation is achieved using words. The facility with symbolic representation to form languages distinguishes humankind from animals. Language is an abstract, rule-governed system of arbitrary symbols that can be combined in countless ways to communicate information. All languages include a system of phonology (i.e., set of sounds), semantics (i.e., word, phrase and sentence meanings), morphology (i.e., rules for combining smallest meaningful units to form or alter words), syntax (i.e., ways in which words are organized into phrases and sentences) and pragmatics (i.e., rules governing a conversation and social use of language).

The use of language enables humankind to develop advanced cognitive abilities. Cognitive development relates to the changes in a person's memory, thinking, use of language and other mental skills as they develop from infants to adults. Humans develop a certain degree of cognitive competence. In addition to such cognitive competence, humans also display and experience feelings, emotions and moods. In particular, our emotional state or the emotional state we desire to elicit can influence our choice of words. Every human language enables people to communicate both intellectually and emotionally because words and phrases convey both cognitive and affective meaning. 'Affective' means to be influenced by or result from emotions.

Linguistics is the scientific study of language. Semantics is the branch of linguistics that deals with the study of the relationship between words or phrases and their meanings. Of particular significance here are the contrasting linguistic terms, denotation and connotation. 'Denotation' is a particular meaning of a symbol. 'Connotation' is an idea or meaning suggested by or associated with a word or phrase. Thus, 'denote' describes the relation between a word or phrase and the thing it conventionally names, whereas 'connote' describes the relation between the word or phrase and the images or associations it evokes. As used herein a denotation is an objective, cognitive meaning which refers to the direct relationship between a term and the object, idea or action it designates. As used herein, a connotation is a subjective, affective meaning which refers to the emotive and associative aspect of a term.

The denotative meanings of words have been systematically codified into definitions and collected together to form dictionaries, thesauruses and related denotative language references. However, the codification of connotative meanings has not been achieved. Consider, for example, a dictionary which provides the following denotative meaning for the word 'pub': "a building providing alcoholic drinks for consumption on the premises" (Oxford Dictionary). However, the word 'pub' simultaneously conveys a host of emotional connotations, such as merriment, pleasure, cheerfulness, perhaps some sadness, and so on. Similarly, words such as 'summer', 'love', and 'melody' have a variety of positive emotional connotative associations for most people, while words such as 'cancer', 'rape', and 'homeless' have negative emotional connotations for most people. In all cases, the associated connotations are not systematically accessible using any known language reference resource or tool.

The reason for the absence of codification of connotative meaning is that, while words readily evoke emotional connotations, the converse is not true: emotional connotations are not easily codified using words. Unlike denotative meaning, affective meaning does not naturally lend itself to systematic word-symbol description. Emotions are felt, not thought, so the relationship between a word and its associated connotative content, while real, is not codifiable using the relatively straightforward methods employed by lexicographers in fashioning denotative definitions. Accordingly, there is a need for a connotation language reference tool and a system for codifying the connotative content of such a tool.

Not only is it desirable to codify connotative meaning, it is desirable to quantify the intensity associated with a connotation. Some words or phrases evoke stronger responses than others. Some words or phrases are more activity oriented. In the 1950s, Charles Osgood, an American psychologist developed a method of constructing bipolar scales based on semantic opposites, such as "good-bad", "soft-hard", "fast-slow," "clean-dirty," "valuable-worthless," "fair-unfair," and so on. Osgood called these scales "semantic differential" scales because they differentiated attitudinal intensity based on a person's subjective understanding of the connotative meanings of words. Osgood et al. explored large amounts of data provided by students who evaluated numerous words and phrases on numerous semantic differential scales. The outcome of Osgood's investigations was a description of the existence of "semantic space," three measurable underlying attitudinal dimensions that proved in subsequent research to be robustly identifiable across other languages and cultures. Osgood named these dimensions Evaluation, Power, and Activity (EPA). Experimentation by many investigators around the world confirmed the reality of semantic space and its cross-cultural validity (Japan, Scandinavia, Germany, Ireland etc.).

The semantic differential is a method for measuring the meaning of an object to an individual. It may also be thought of as a series of attitude scales.

A subject is asked to rate a given concept (for example, 'Irish', 'Republican', 'wife', 'me as I am') on a series of seven-point bipolar rating scales. Any concept—whether it is a political issue, a person, an institution, a work of art—can be rated. Subgroups of the scales can be summed up to yield scores that are interpreted as indicating the individual's position on three underlying dimensions of attitude toward the object being rated. These dimensions have been identified by using factor-analytic procedures in examining the responses of many individuals concerning many concepts or objects. It has been found that three subgroups measure the following three dimensions of attitude: (1) the individual's evaluation of the object or concept being rated, corresponding to the favorable-unfavorable dimension in more traditional attitude scales; (2) the individual's perception of the potency or power of the object or concept; and (3) the individual's perception of the activity of the object or concept. (See Kidder, L. H., "Research Methods in Social Relations;" 1981).

The problem with the semantic differential technique is that it does not distinguish beyond a single evaluative continuum, with positive attitude at one end of the scale through negative attitude at the other end. That is, it does not actually identify any individual emotions. Moreover, although several short "semantic differential dictionaries" have been developed (known in the literature as semantic "atlases" because they are analogous to "maps" of semantic space), consisting of 500 to 1,500 words with EPA scores for each word, the technique of semantic differential is not associated with any system or method for codifying the words of any given language, even on a single affective variable, Accordingly, there is a need for a system of quantifying connotative meanings.

SUMMARY OF THE INVENTION

According to the invention, a system for identifying connotative meaning of words or phrases is implemented. A given word or phrase has its connotative meaning determined for a given denotative context. A data base is formed having multiple records. Each record corresponds to a term (i.e., word or phrase) and its denotative context. Zero, one or more connotative associations are defined for each record.

According to another aspect of the invention, each record is evaluated by a plurality of connotative judges for a connotative association within a given emotional category. There are a predefined plurality of emotional categories established for evaluating connotative associations of terms. Within each emotional category there are a plurality of emotional descriptors.

According to one embodiment of the invention, there are eight emotional categories predefined for the English language: affection/friendliness, amusement/excitement, enjoyment/elation, contentment/gratitude, sadness/grief, anger/loathing, fear/uneasiness, and humiliation/shame. A plurality of descriptors are predefined for each emotional category.

According to another aspect of the invention, each connotative judge examines the denotative context of a given word or phrase and selects an emotional descriptor which the judge associates with such word or phrase in the given denotative context. The judge is given the emotional descriptors from a single category and selects the primary emotional descriptor, or both a primary and a secondary emotional descriptor which the judge associates with the word or phrase. Alternatively, the judge may indicate that none of the descriptors are associated with the word or phrase, or that the judge is unfamiliar with the word or phrase and its denotative context. In a separate analysis the judge is given the same or a different record, When the same record is presented, the judge is given a different set of emotional descriptors from a different emotional category. Again, the judge selects the primary emotional descriptor, or both a primary and a secondary emotional descriptor which the judge associates with the word or phrase. As with the prior record, the judge may indicate that none of the descriptors are associated with the word or phrase, or that the judge is unfamiliar with the word or phrase and its denotative context.

According to another aspect of the invention, for each record for which the judge selects an emotional descriptor, the judge also enters an intensity rating for such descriptor.

According to another aspect of the invention, a method of calibrating the 'judges' intensity ratings is performed. When a judge evaluates records for connotative meaning for a given emotional category of emotional descriptors, the judge also reviews a list of anchor words or phrases (i.e., anchor terms) for such emotional category. There is a list of anchor terms for each intensity rating for such category. The judge selects one or more of the anchor terms for a given intensity rating which the judge feels most accurately corresponds to the given intensity rating. The judge does this for each intensity rating in each emotional category for which the judge is determining connotative meaning on a given questionnaire.

According to another aspect of the invention, each record is evaluated by a statistically significant number of judges for each one of the emotional categories. The results are processed to evaluate which emotional descriptors are most often associated with each given record. Anomalous results are purged (e.g., when the judge fills in responses at random rather than doing the mental work solicited; when the judge codes in a lot of alternative responses such as 'no connotative association' or 'Unfamiliar with denotative context'). In a specific embodiment a statistical analysis is performed to assure that the selected emotional descriptors were not selected by chance. Where the emotional descriptor was selected enough times that the probability indicates it was not selected by chance, then the emotional descriptor is accepted as a connotative association for the word or phrase in the corresponding denotative context. Such association is retained in the database as part of the record for the word or phrase and its denotative meaning. Note that there may be 0, 1 or more connotative associations with any given record.

According to another aspect of the invention, the connotative associations are continuously updated, either at prescribed intervals or on an ongoing basis, such as through a World Wide Web site. In this way, connotative judges are able to supply data continuously, with turnover of connotative judges easily managed, and the database, particularly the connotative component, kept up to date with the changing times.

According to another aspect of the invention, a panel of judges is selected from a pool of judges to respond to a questionnaire. The questionnaire includes a plurality of records and allows selection of 0 or 1—or in some embodiments 2—emotional descriptors to be associated with any given record. The questionnaire also includes the anchor words selected in effect to 'calibrate' the judges responses. The choices of emotional descriptors are limited to those in one emotional category. The same or a different panel of judges then evaluates the same plurality of records for a different emotional category. Eventually, each record is evaluated for each of the emotional categories by a desired number of connotative judges.

By practicing the above method and system of the present invention, a complete and accurate connotative language reference map and database is constructed in any language, which then can be used to construct connotative equivalents of denotative language reference resources, such as connotative dictionaries, connotative thesauruses, and connotative text analysis tools.

These and other aspects and advantages of the invention will be better understood by reference to the following detailed description taken in conjunction with the accompanying drawings.

BRIEF DESCRIPTION OF THE DRAWINGS

FIG. 8 is a diagram of a system for identifying connotative meanings according to an embodiment of this invention.

DESCRIPTION OF SPECIFIC EMBODIMENTS

A system and method are described for identifying, codifying, storing, and retrieving the connotative meaning inherent in the words and phrases of any language. Throughout this description, a preferred embodiment and examples given should be considered as exemplars rather than limitations on the method and system of the present invention.

Figure 1:
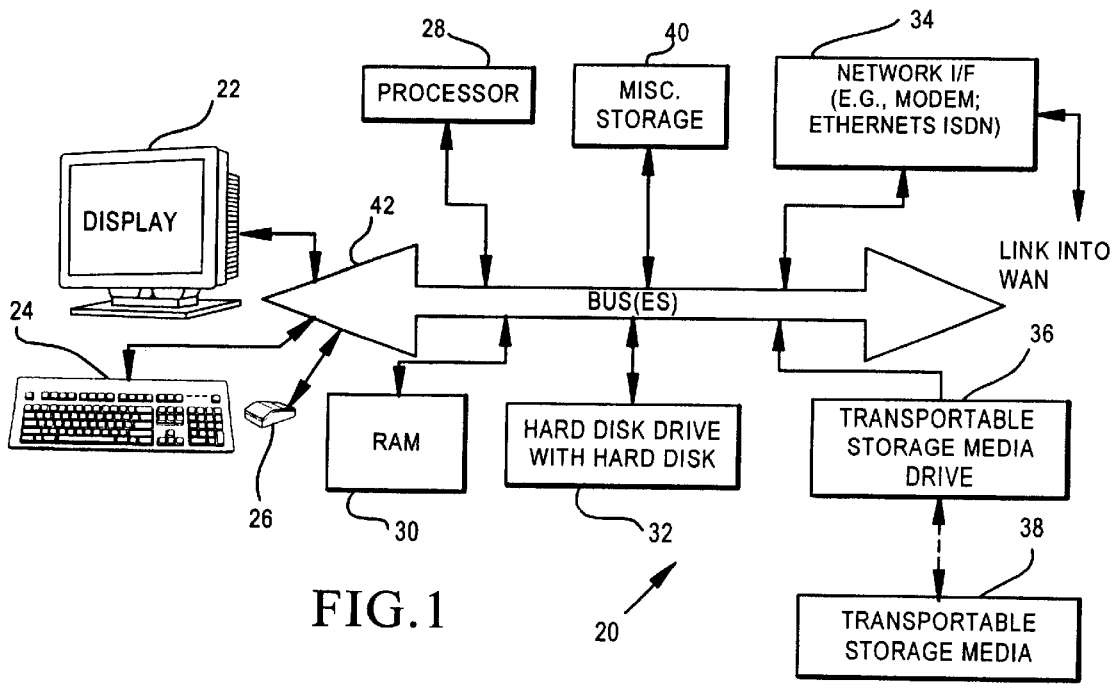
FIG. 1 is a block diagram of a host computer system.

Many of the functions of the present inventions preferably are performed by or with the assistance of a programmed digital computer of the type which is well known in the art, an example of which is shown in FIG. 1. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reduced-feature network terminal device.

The connotative language reference serves as an interactive electronic connotative dictionary, thesaurus or other language reference. For a connotative dictionary embodiment, the connotative dictionary is distinct from a 'classic' dictionary in that it lists words with their connotative meanings. For a connotative thesaurus embodiment, the connotative thesaurus is distinct from a 'classic' thesaurus in that words are linked when they have the same or a similar emotional or related connotative meaning, but typically have a different denotative meaning. These linked words are referred to herein as "connonyms," a coined word meaning connotative synonyms. The data bases forming a computer version of the connotative language references may be formed using custom-designed database software or database software commercially available from manufacturers such as Inprise, Oracle, Microsoft or another vendor of data base software services.

Following are sections which describe preferred embodiments of a connotative language reference, methods for identifying connotative meanings, methods for quantifying intensity of connotative meanings, methods for assuring data integrity, and method for identifying human interest areas.

Connotative Language Reference

Figure 2:
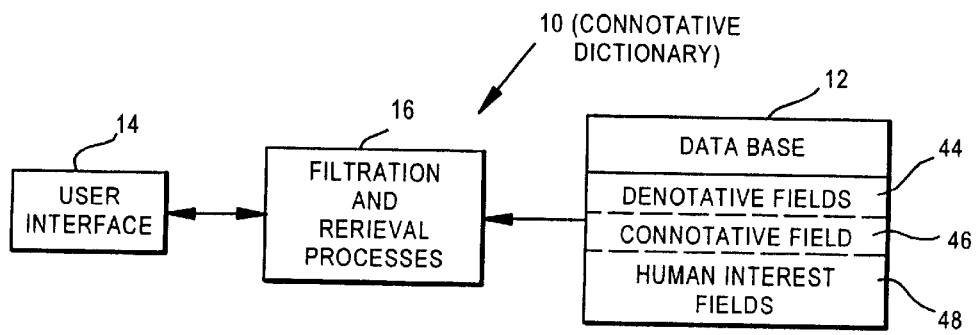
FIG. 2 is a diagram of a connotative dictionary according to an embodiment of this invention.

Referring to FIG. 2, a connotative language reference system 10 is formed by a data base 12, a user interface 14 and various filtering and retrieval processes 16. Preferably such data base 12, interface 14 and processes 16 are implemented in electronic format as one or more software programs executed on a host computer system or over a host computer network. For example, the reference system 10 may be stored on an optical disc (e.g., CD-ROM) or other storage media and installed onto a host computer system or network. Specifically, the data base 12, user interface software 14 and filtering and retrieval processes 16 may be loaded and installed locally onto the host computer system or network. In some implementations the software embodying the user interface 14 and processes 16 are installed to be resident on the host computer system or network, while the data base 12 is stored and accessed from a removable storage media, such as an optical disk. In other embodiments the data base 12 is centrally located among one or more network server computers, while the user interface software 14 and processes 16 are stored and executed from either a local end user computer system or remotely at the server computer. The implementations may vary from local copies for a given end user's access to one or more copies stored on a private network or even a global computer network which users log into to access and use the dictionary.

Data Base 12:

In a preferred embodiment of the data base 12, the data base 12 includes a set of denotative fields 44, a set of connotative fields 46, and a set of human interest fields 48. The denotative fields and human interest fields are not necessary, but provide additional resources for the user. In some embodiments the data base 12 includes only the set of connotative fields 46.

The set of denotative fields 44 includes at least two fields, and preferably three fields. In one implementation the denotative data is obtained from one or more electronic or print-based dictionaries in any language. Database records are created for each word or phrase of the language, which may be the English language or any other language. In some embodiments the connotative language reference system 10 is specialized for a given subject (e.g., medical/health contexts; science). In other embodiments a general language reference is implemented for a given language. Table 1 below list the two desired fields and one optional field included among the denotative fields:

TABLE 1

Denotative Field Types

1. Term (i.e., Word or phrase/idiom)
2. Specific denotative context
3. Part of speech (optional)

For each record in the data base 12, one denotative field is assigned to a specific term, such as a word or phrase. A second denotative field is assigned to the denotative context (dictionary meaning) of the term. A third denotative field is assigned to the part of speech of the term of field 1 when used in the context of field 2. Preferably, each context of each term is assigned a separate database record. Thus, if the dictionary definition of a single term has two meanings among a total of five contexts, then there are five records, one for each context. There may be multiple contexts for a given dictionary meaning when, for example, there are different parts of speech for the term.

Assigning an additional field to track the meanings that subsume the contexts is not necessary to practice the invention, but such a field may be assigned in an alternative embodiment. The total number of records included in the database 12 typically is equal to the sum of all of the denotative contexts of all of the terms obtained from the denotative data source or sources.

In a preferred embodiment the set of connotative fields 46 includes a block of one or more fields corresponding to each one of a plurality of emotional categories. In a best mode embodiment eight emotional categories have been identified, although the number of categories may vary to be more or less than eight. The number of fields comprising each block may vary. In one embodiment there is one field in each block that corresponds to a primary connotative emotional descriptor for the corresponding term. In some embodiments there is a field for storing a secondary connotative emotional descriptor for the corresponding term. Note that the primary and or secondary emotional descriptor can correspond to a designation of no connotative meaning stored in this emotional category for the given term.

In addition to the fields for the primary and optional secondary emotional descriptors, there also are fields associated with each block relating to the method for identifying connotative meaning. Although the method for defining connotative meaning may vary, in one embodiment the data is collected from multiple sources. In a given implementation the sources are judges or panels of judges. In some embodiments there is a field in each block for each judge's selection of the term's connotative meaning. In an example, where 24 connotative judges are used, each of the eight blocks of fields 46 includes 24 individual fields used in deriving the primary and/or secondary emotional descriptor for the term—a respective field to hold each judge's emotional descriptor data for each term in each context. Several additional fields are reserved to hold calculated data based on the connotative judges' emotional descriptor data. Fewer or more judges may be used, adjusting the number of fields within each block accordingly.

Table 2 lists eight emotional categories corresponding to the eight blocks of fields 46 for a best mode embodiment. In the exemplary embodiment the categories are classified into categories for positive emotions and categories for negative emotions. The general emotional classification "Positive Emotions" subsumes four emotional categories, and the general emotional classification "Negative Emotions" subsumes the other four emotional categories, as practiced in a preferred embodiment of the invention. Each emotional category subsumes a list of specific emotional descriptors (e.g., in this embodiment there are 12 to 37 emotional descriptors per category), each of which is associated with a two-digit identifying code number. The specific code number may vary. Further, the manner in identifying the distinct descriptors also may vary. The total number of emotional descriptors in this example is 164. In various embodiments one or more emotional descriptors may be removed from this list, entire emotional categories may be removed from the list, or one or more emotional categories and descriptors may be added to this list. In a preferred embodiment it is the code numbers which are stored in the records of the data base 12. In other embodiments the entire emotional descriptor term may be stored individually for each connotative data field of a record.

The connotative emotional descriptors that appear in Table 2 are English language emotional descriptors for one embodiment of a general connotative dictionary. The specific words that make up the emotional connotative descriptors may vary. Of course such descriptors will vary from language to language.

TABLE 2

Connotative Database Fields
POSITIVE EMOTIONS

| Affection/<br>Friendliness | Amusement/<br>Excitement | Enjoyment/<br>Elation | Contentment/<br>Gratitude |
|---|---|---|---|
| 01 Adoration | 01 Amazement | 01 Admiration | 01 Appreciation |
| 02 Affection | 02 Amusement | 02 Bliss | 02 Comfort |
| 03 Amorousness | 03 Astonishment | 03 Cheer | 03 Contentment |
| 04 Devotion | 04 Eagerness | 04 Delight | 04 Gladness |
| 05 Fondness | 05 Enthusiasm | 05 Ecstasy | 05 Gratitude |
| 06 Friendliness | 06 Excitement | 06 Elation | 06 Hope |
| 07 Infatuation | 07 Exhilaration | 07 Enjoyment | 07 Peacefulness |
| 08 Kindliness | 08 Exuberance | 08 Euphoria | 08 Reiief |
| 09 Liking | 09 Fun | 09 Exultation | 09 Satisfaction |
| 10 Love | 10 Glee | 10 Happiness | 10 Serenity |
| 11 Lust | 11 Hilarity | 11 Joy | 11 Thankfulness |
| 12 Passion | 12 Merriment | 12 Jubilation | 12 Well-being |
| 13 Tenderness | 13 Mirth | 13 Pleasure | |
| 14 Trust | 14 Surprise | 14 Pride | |
| 15 Warmth | 15 Thrill | 15 Rapture | |
| | 16 Wonder | | |

NEGATIVE EMOTIONS

| Sadness/Grief | Fear/Uneasiness | Anger/Loathing | Humiliation/<br>Shame |
|---|---|---|---|
| 01 Affliction | 01 Alarm | 01 Abhorrence | 01 Chagrin |
| 02 Agony | 02 Anxiety | 02 Acrimony | 02 Contrition |
| 03 Anguish | 03 Apprehension | 03 Aggravation | 03 Degradation |
| 04 Dejection | 04 Desperation | 04 Anger | 04 Discredit |
| 05 Demoralization | 05 Distress | 05 Animosity | 05 Disgrace |
| 06 Depression | 06 Dread | 06 Annoyance | 06 Dishonor |
| 07 Desolation | 07 Fear | 07 Antagonism | 07 Disrepute |
| 08 Despair | 08 Horror | 08 Antipathy | 08 Disrespect |
| 09 Despondency | 09 Nervousness | 09 Aversion | 09 Embarrassment |
| 10 Disappointment | 10 Panic | 10 Bitterness | 10 Guilt |
| 11 Discouragement | 11 Paranoia | 11 Contempt | 11 Humiliation |
| 12 Disheartenment | 12 Stress | 12 Creepiness | 12 Indignity |
| 13 Disillusionment | 13 Tension | 13 Detestation | 13 Mortification |
| 14 Dismay | 14 Terror | 14 Dissatisfaction | 14 Regret |
| 15 Distress | 15 Uneasiness | 15 Disdain | 15 Remorse |

TABLE 2-continued

| | | | |
|---|---|---|---|
| 16 Downheartedness | 16 Worry | 16 Disgust | 16 Shame |
| 17 Forlornness | | 17 Dislike | 17 Stigma |
| 18 Gloom | | 18 Enmity | |
| 19 Grief | | 19 Envy | |
| 20 Heartache | | 20 Exasperation | |
| 21 Heartbreak | | 21 Frustration | |
| 22 Heartsickness | | 22 Fury | |
| 23 Hopelessness | | 23 Hatred | |
| 24 Hurt | | 24 Hostility | |
| 25 Longing | | 25 Irritation | |
| 26 Melancholy | | 26 Indignation | |
| 27 Misery | | 27 Ire | |
| 28 Pain | | 28 Jealousy | |
| 29 Pity | | 29 Loathing | |
| 30 Sadness | | 30 Offense | |
| 31 Sorrow | | 31 Outrage | |
| 32 Suffering | | 32 Rage | |
| 33 Torment | | 33 Rancor | |
| 34 Unhappiness | | 34 Resentment | |
| 35 Wretchedness | | 35 Vexation | |
| 36 Yearning | | 36 Virulence | |
| | | 37 Wrath | |

In a preferred embodiment each record also includes a plurality of human interest fields 48 which each relate the corresponding term and its denotative context to a human interest category. The purpose of incorporating the human interest fields is to permit the end user to easily retrieve special connotative content from the database by first selecting one or more human interest filters before querying the database. The human interest fields 48 employed in an exemplary embodiment of the invention are listed in Table 3. There are nine groupings of the human interest categories in such embodiment. Each record includes a set of nine human interest fields—one field for each human interest category. Each field stores a human interest descriptor word. Of course, the field also may store a designation that there is no human interest context for the term as used in the associated denotative context of a given record. The human interest categories and descriptors may vary from embodiment to embodiment.

TABLE 3

SET 3: Human Interest Database Fields

| Non-emotional Connotations | Organizations of Note |
|---|---|
| Power | Home |
| Activity | Personal Relationships |
| Rhythm | Intimacy |
| Number of Syllables | Spiritual Identity |
| Accented Syllable | Biblical Diction |
| Special Diction | Christianity |
| Question-starting Words | Judaism |
| Core Words Identified by S. I. | Islam |
| Hayakawa | Hinduism |
| Personal Identity | Buddhism |
| Gender | Other Religious |
| First Names (Baby Names) | Myth and Legend |
| Notorious Or Celebrated People | Paranormal |
| Languages | Physical Identity |
| National Identity | Physical Appearance |
| Perception | Body |
| Abstract/Concrete Continuum | Health |

TABLE 3-continued

SET 3: Human Interest Database Fields

| | |
|---|---|
| Place, General | Non-human Life |
| Place, Event | Animals |
| Place, Transportation | Plants |
| Place, Cosmos | Micro Organisms |
| Place, Noted | Argot/Vernacular |
| Color | Slang |
| Hearing | Taboo |
| Touch | Offensive |
| Taste | Derogatory |
| Smell | Disgusting/Revolting |
| Time, General | Euphemistic |
| Time, Historical | Cliche |
| Time, Calendar | |
| Non-medical Drug Use | |

In a preferred embodiment of the invention, the assignment of the fields and records as described above effectively links each traditional dictionary definition of each term in each context with more than 200 connotative and human interest variables. Specifically, a given record identifies a denotative context and part of speech for a given word or phrase. Also associated with such record are one or more emotional descriptors from one or more emotional categories. Further, many records also may have one or more associated human interest descriptors.

In addition, there are additional miscellaneous fields defined in some embodiments. One such field is to store a rating for the degree of power which the term has in the associated denotative context. Another miscellaneous field is to store a rating of the degree of activity associated with the term in the corresponding denotative context. Yet another miscellaneous field is to store a rating along a scale spanning from concrete to abstract.

User Interface 14:

In a preferred embodiment a graphical user interface is implemented, which provides an end user with the capability of retrieving data from the data base 12. Although there are many ways in which a user interface may be implemented, in one embodiment a system with menus and windows is implemented.

Following is a description of a user interface for a connotative dictionary embodiment of the connotative language reference. Such user interface 14 is operated in either one of look-up mode or look-for mode. During 'look-up' mode a user enters a word or phrase and data is retrieved from the database 12 and displayed to the user. In 'look for' mode a user enters parameters into various filtering processes which are implemented to retrieve terms which correspond to criteria defined by the parameters.

Figure 3:
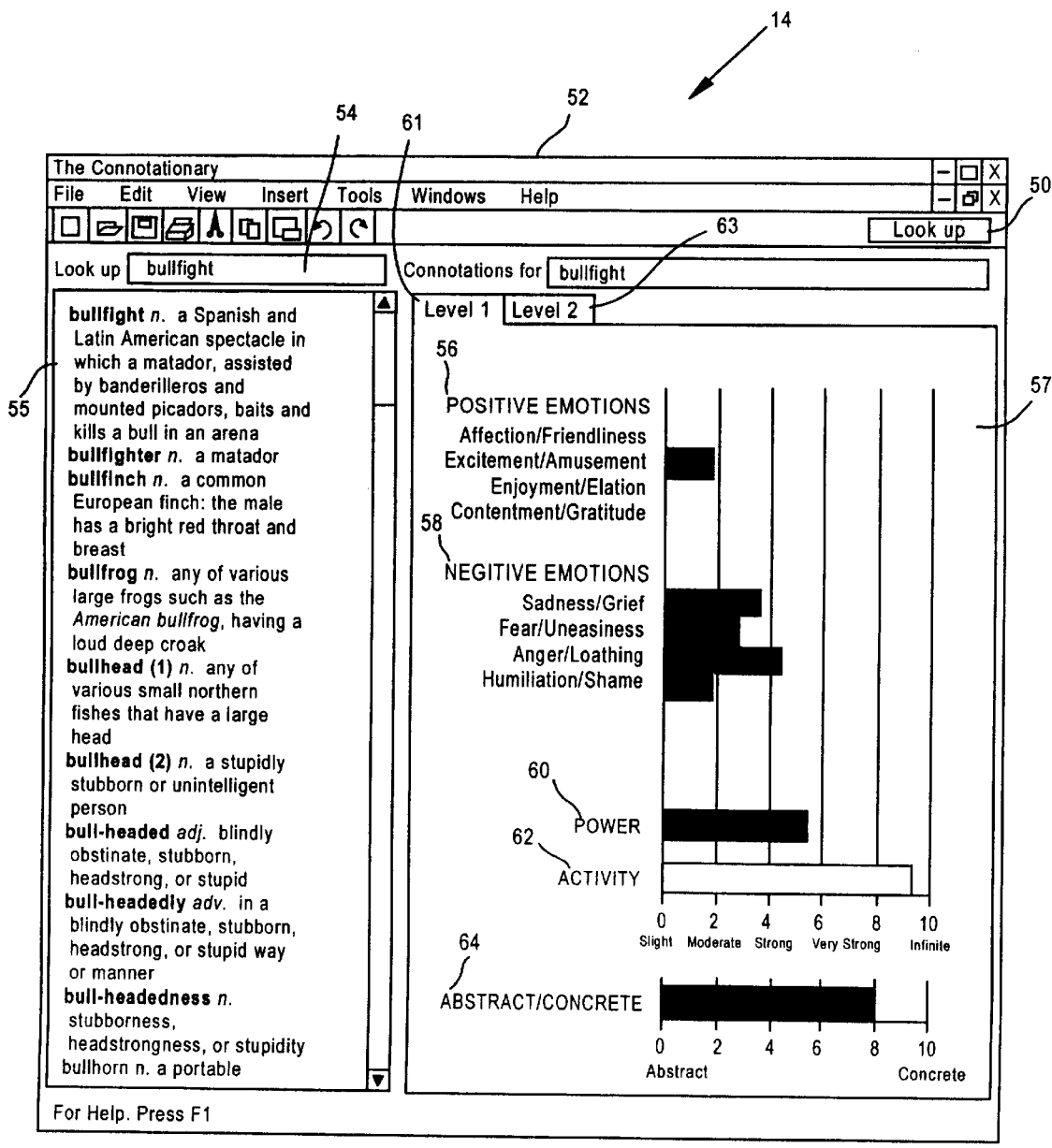
FIG. 3 is a display sample of a user interface in 'look up' mode according to an embodiment of this invention.

FIG. 3 shows an embodiment of the graphical user interface 14 in 'look up' mode. The mode is indicated on a button 50 in the upper right corner of the interface window 52, When in 'look up' mode, the user may type a word or phrase into a 'look Up' box 54 in the upper left corner of the interface window 52. The connotative dictionary responds to the user's typed input by retrieving denotative information from the database 12 relating to the word or phrase that has been typed into the 'look up' box 54. This denotative information is displayed alphabetically in an area 55 (e.g., column) on the left-hand side of the user interface, and is formatted in much the same manner as the game denotative information is displayed and formatted in any conventional electronic dictionary.

Simultaneously, the dictionary 10 retrieves from the database 12 and displays on display 22 a range of connotative information relating to the same word or phrase that the user has typed in the 'look up' box 54. This connotative information is displayed in an area 57 on the right-hand side of the user interface window 52. Although specific formats and locations are being described the specific format and location of information within the window 52 may vary. In one embodiment the connotative information is displayed in a color-coded graphical format, including horizontal bars. Preferably, the relative lengths of the horizontal bars represent data corresponding to connotative intensity (strength or weakness). In one example, the colors designate the following:

| | |
|---|---|
| Green (56) | Positive emotional connotations |
| Red (58) | Negative emotional connotations |
| Grey (60) | Connotations of power |
| Yellow (62) | Connotations of activity |
| Olive (64) | Connotations of abstractness or concreteness |

A set of two tabs 61, 63, labeled "Level 1" and "Level 2," indicate the level of emotional classification and categorization of the connotative data represented in the graphical display area 57, 59 associated with the selected tab. In one embodiment these levels of classification and categorization are defined as follows:

Level 1: Four level 1 categories of "Positive Emotions" and four level 1 categories of "Negative Emotions" for the embodiment illustrated in FIG. 3.

Level 2: Each level 1 emotional category subsumes a list of 12 to 37 specific emotional descriptors (e.g., level 2 information), as listed in Table 2. Only the level 2 emotional descriptors associated with the word displayed in the 'Look up' box are displayed.

Figure 4:
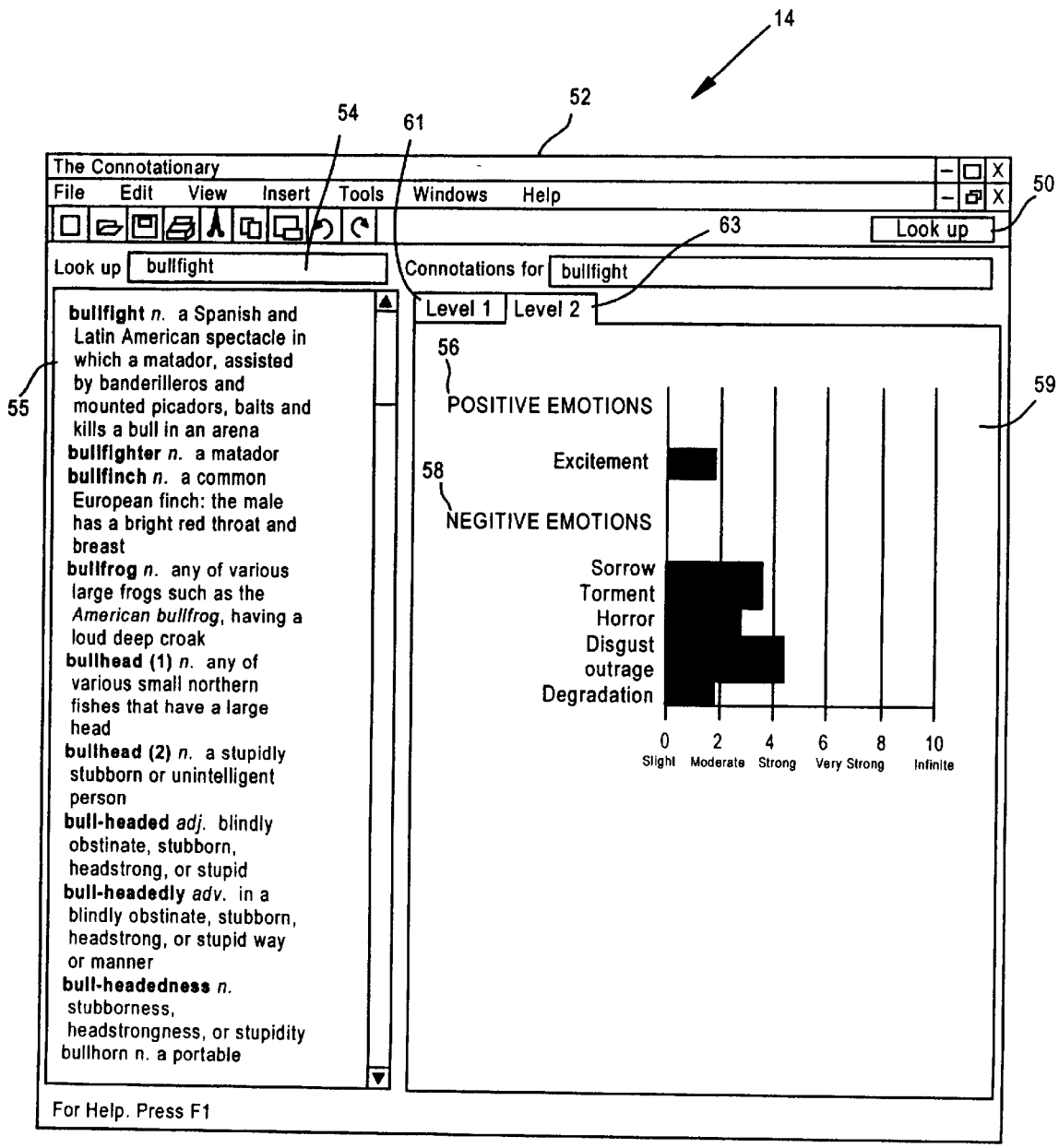
FIG. 4 is another display sample of the user interface in 'look up' mode according to an embodiment of this invention.

FIG. 4 shows the user interface 14 in 'look up' mode with the level 2 data being displayed in window area 59 for a selected term highlighted in window area 55. Such window area 59 overlays area 57 when tab 63 is selected.

Figure 5:
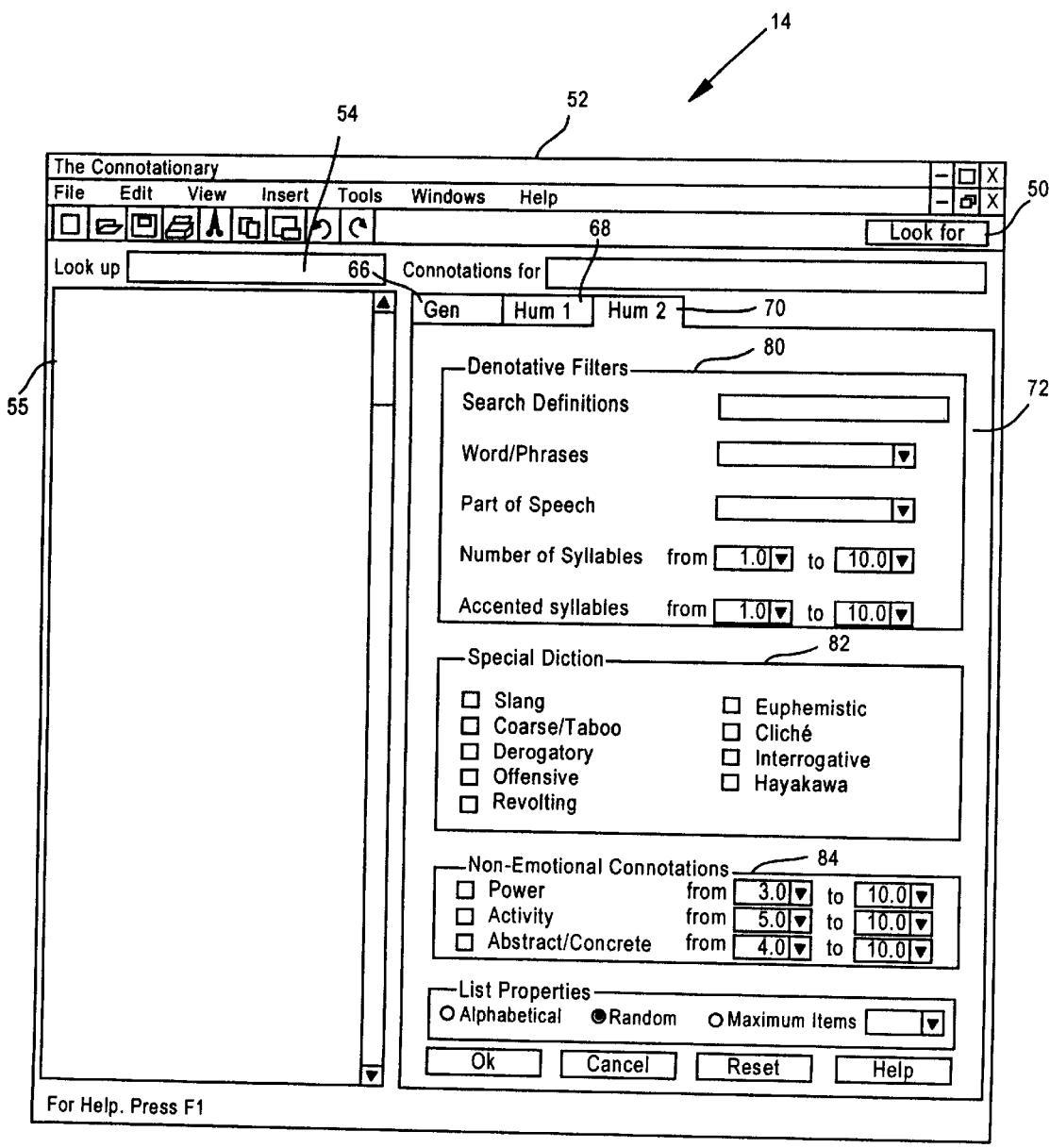
FIG. 5 is a display sample of a user interface in 'look for' mode according to an embodiment of this invention.
Figure 6:
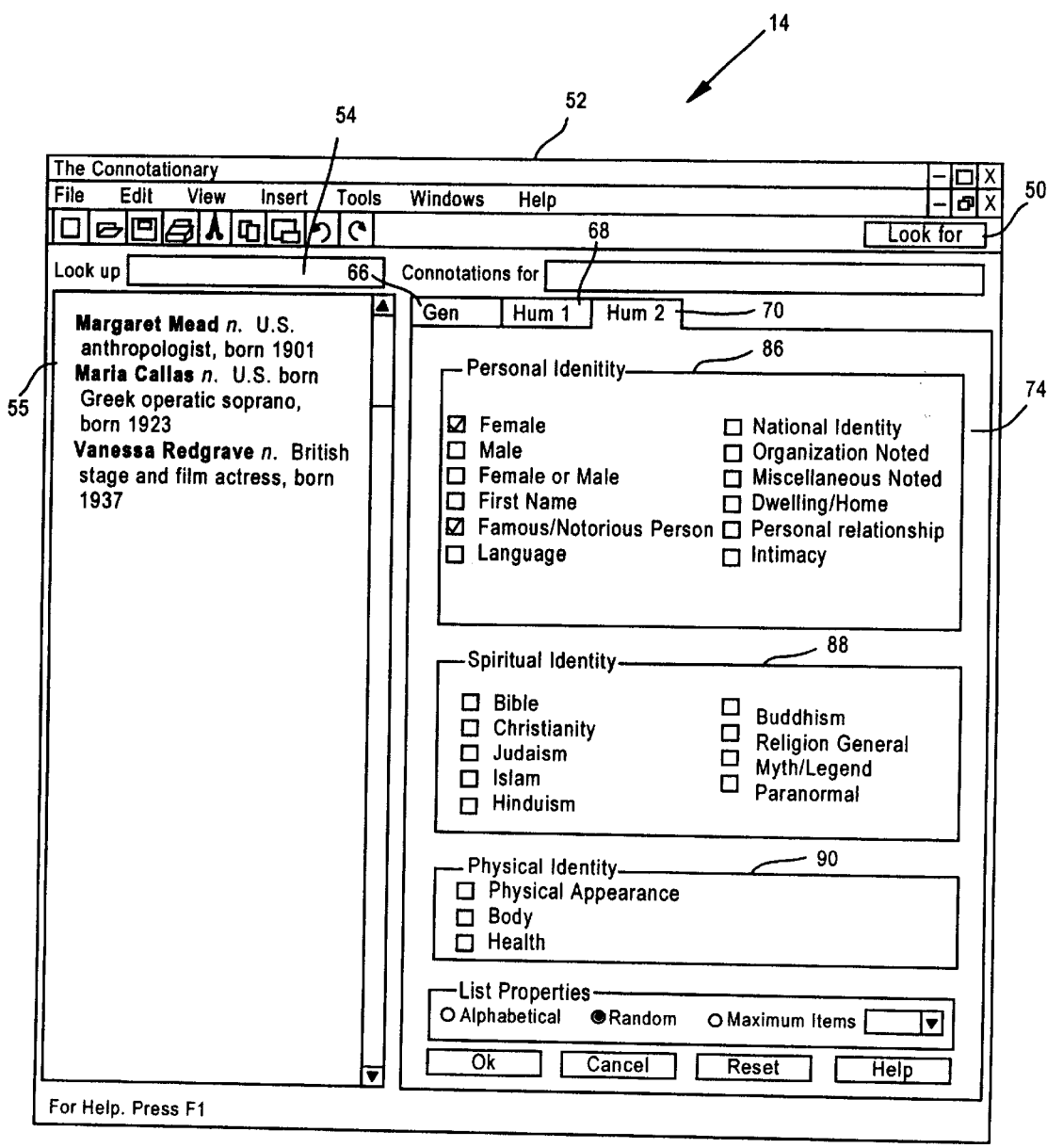
FIG. 6 is another display sample of a user interface in 'look for' mode according to an embodiment of this invention.
Figure 7:
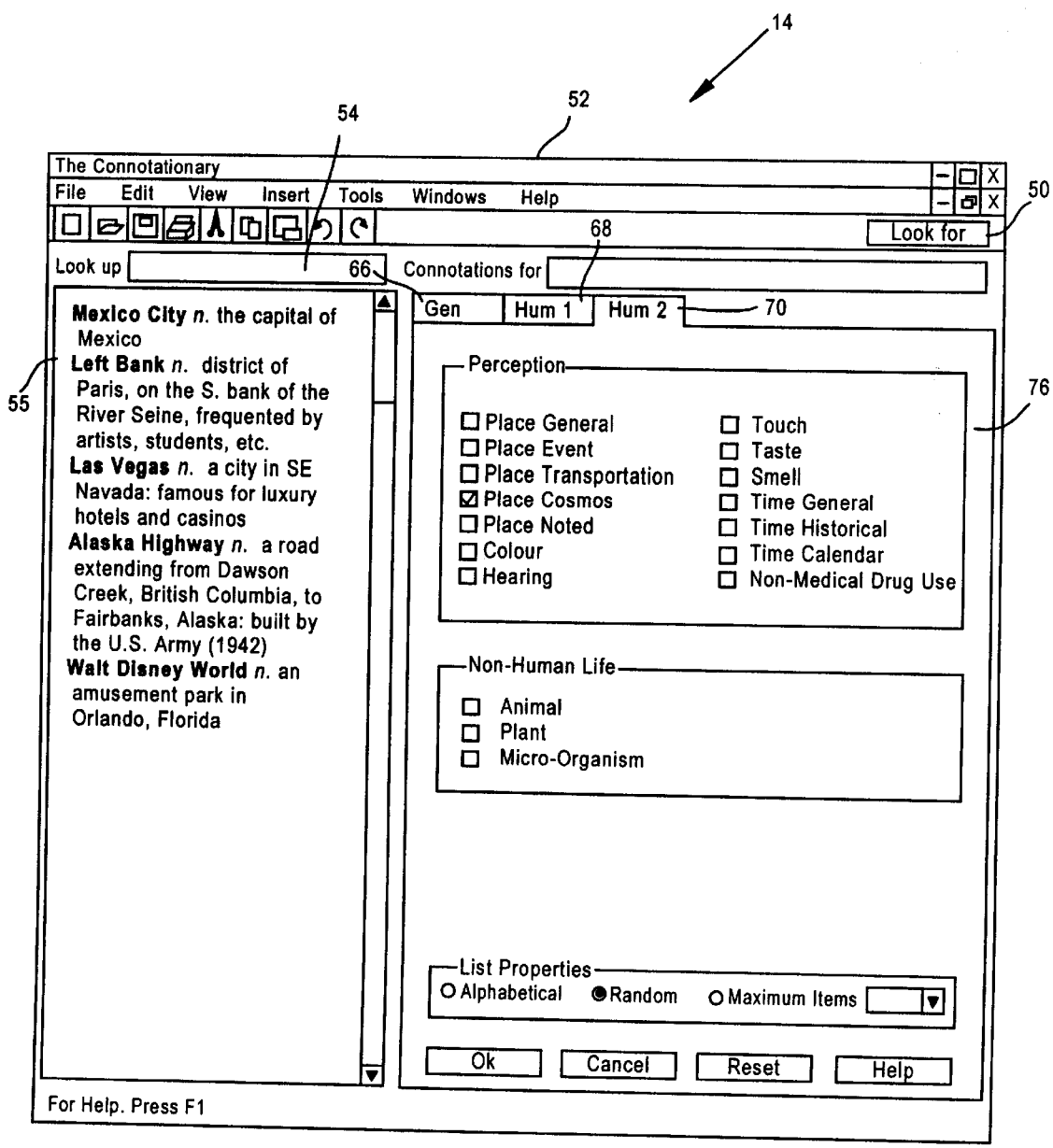
FIG. 7 is yet another display sample of a user interface in 'look for' mode according to an embodiment of this invention.

FIGS. 5–7 show the user interface 14 in 'look for' mode. The user enters 'look for' mode by toggling the 'Look up/Look for' toggle button 50. In a preferred embodiment of the invention, switching to 'Look for' mode changes the window 52 format to display a set of three tabs 66, 68, 70 with corresponding overlaying window areas 72, 74, 76. These tabs and window areas replace the tabs 61, 63 and window areas 57, 59 of the 'look up' mode.

In 'look for' mode the user may retrieve connotative content from the database 12. First, the user selects criteria from one or more human interest filters. Then the user initiates a search of the data base 12 for records matching the selected criteria. The human interest fields 48 employed in a preferred embodiment of the invention are listed in Table 3. These fields are displayed among the window areas 72, 74, 76 and are accessed by pressing on the corresponding tab 66, 68, or 70. The number of tabs 66, 68, 70 and the allocation of human interest fields 48 to the window areas 72, 74, 76 may vary.

In one embodiment the human interest fields associated with tab 66 are the special diction fields, the argot/vernacular fields and the non-emotional connotation fields of Table 3. In addition there are denotative filters 80 included in window area 72 for defining selection criteria. The user can search specific definitions, limit the words and phrases or parts of speech, limit the number of syllables or the accented syllable using the denotative filters 80. The user can select among slang, coarse, derogatory and other types of diction and vernacular under the heading of special diction filters 82.

The non-emotional connotation filters 84 relate to scaled values based on a power quality, activity quality or abstract/concrete quality (i.e., the criteria relating to the miscellaneous fields described above).

Referring to Fig, 6, window area 74, which is selected by pressing on tab 68, includes personal identity filters 86, spiritual identity filters 88 and physical identity filters 90. In the example illustrated, the user has specified a filtered search of the database for a random selection of famous or notorious female persons. The language reference system 10 retrieves the requested information and displays it in the window on the left-hand side of the user interface, once the user finalizes the choices by clicking on the button labeled 'OK.'

The user may select several human interest filters for a single search, in order to retrieve very particular customized lists of words and phrases. In a preferred embodiment of the invention, when the user has retrieved a customized list, the user may then switch back to 'look up' mode and retrieve all of the connotative information associated with any of the words and phrases in the customized list.

The human interest fields associated with the third tab in 'look for' mode are displayed in FIG. 7. In the example illustrated, the user has specified a filtered search of the database 12 for a random selection of noted places. The apparatus retrieves the requested information and displays it in the window on the left-hand side of the interface. Note that the user may switch among window areas 72, 74, and 76 to select desired criteria. Once all selection are made, the user clicks on the 'OK' button causing a search of the data base 12 for terms meeting the selected criteria.

Identifying Connotative Meaning

According to a preferred embodiment of the invention the connotative meanings associated with the terms found in the connotative language reference system 10 are derived by subjective responses from a plurality of evaluators. In a best mode embodiment the evaluators are a panel of persons having objective credentials or accepted expertise in connotative analysis. However, in some embodiments the evaluators may be selected at random. Such persons are referred to herein as connotative judges. In a preferred embodiment, the Internet is used as a recruitment medium to recruit 100 to 200 individuals who are not known to each other to act as independent connotative judges. In one embodiment, the connotative judges are screened for the following characteristics listed below in Table 4:

TABLE 4

Characteristics and Qualifications of Connotative Judges 1. 25% of all judges aged 40 or older and female
2. 25% of all judges under the age of 40 and female
3. 25% of all judges aged 40 or older and male
4. 25% of all judges under the age of 40 and male
5. All judges having at least 2 years of post-secondary education
6. All judges having an above-average vocabulary and command of whichever language is being used to practice the invention.
7. All judges having a substantial interest and some experience in the craft of writing, preferably creative writing.
8. Judges geographically dispersed over the area of interest for the language of interest.

While the above qualifications are used in one embodiment, the invention may be practiced using any number of judges having any qualifications of one's choosing. For example, connotative judges may be only women, or only men, or only individuals of a defined age or ethnic group, or only people who reside in a certain geographical location. The nature and quality of data captured will of course vary with the demographic profile of connotative judges, as well as with the number of judges used when practicing the invention, their geographical locations, and the linguistic qualifications of the judges.

The connotative judges evaluate the meaning of given words and phrases for connotative content using a questionnaire. The questionnaires preferably are distributed as database software files, although they may also be distributed in paper document form. The responses of the connotative judges are processed using either custom-designed database software or database software commercially available from manufacturers such as Inprise, Oracle, and Microsoft. As the data are analyzed, a database of connotative meaning is constructed, which is linked with each context of each word in the connotative language reference system. Each questionnaire is, in effect, a small database table containing four data fields, preferably five data fields, as summarized in Table 5.

TABLE 5

Data Fields for Questionnaire Tables to Capture Connotative Data

| | |
|---|---|
| Field 1 | A field containing a term selected at random from the term field of the main database |
| Field 2 | A field containing the denotative context for the term in Field 1 |
| Field 3 | A field containing the part of speech for the term in Field 1 (optional, but preferred) |
| Field 4 | A blank field assigned for the connotative judge to record data identifying emotional connotations associated with the term, context and part of speech in Fields 1, 2 and 3 |
| Field 5 | A blank field assigned for the connotative judge to record data corresponding to intensity of emotion associated with the term, context and part of speech in Fields 1, 2 and 3 |

Field 4 is used for identifying connotational meaning. Field 5 is used for identifying the intensity of the connotation. The use of Field 5 is described below in the section, System for Quantifying Intensity of Connotative Meanings.

In one embodiment, a distributed computing model is employed, in which the connotative judges use their own computers in their own homes or offices to receive questionnaire tables over the Internet (via e-mail or from a World Wide Web site) that are extracted from the main database 12. The connotative judges complete their work on the questionnaire tables, and then return the data tables over the Internet.

Referring to FIG. 8, a pool 80 of connotative judges are recruited to evaluate records of the connotative data base 12 for connotative associations of corresponding words and phrases. A sample of judges from the pool 80 forms a panel 82 used to evaluate a set of records. The same or different panels are formed to evaluate other sets of records. The number of records in a set may vary. For purposes of illustration a panel of 24 judges is described which evaluates a set of 500 records. In a preferred embodiment, each judge typically receives a questionnaire table 84 covering approximately 500 records, each record consisting of the four fields identified in Table 4. The questionnaire also includes instructions for selecting a code number to fill in the blank Field 4 for each record. Each connotative judge is also supplied with one or more of the eight category lists of code-numbered emotional descriptors identified in Table 2. In a preferred embodiment for a given questionnaire each judge is supplied with only one of the eight category lists of emotional descriptors found in Table 2. Thus, in a given questionnaire a judge evaluates the terms for connotative meaning in only a specific emotional category. To complete the questionnaire table, the connotative judge inputs one of three codes or code types for each record in Field 4, as listed in Table 6.

TABLE 6

Coding Alternatives for Capturing SET 2 Connotative Data

1. Code the two-digit number (see Table 2 above) associated with one and only one emotional descriptor that most closely matches the emotional connotation that the connotative judge associates with the term in Field 1, considering the denotative context and part of speech in Fields 2 and 3.
2. Code "00" if the connotative judge understands the term and its denotative context, but does not associate any of the emotional descriptors from the supplied list of emotional descriptors with the term and its denotative context.
3. Code "99" if the connotative judge does not know the term, or the specific associated denotative context.

In a preferred method of practicing the invention, only one judgment is required for each record in a questionnaire table. However, in other embodiments more than one judgment may be allowed or required, if, for example, one wishes to capture the connotative judge's first choice and also the connotative judge's second choice of emotional descriptor. To effect such data capture, the number of connotative fields 46 (see FIG. 2) would need to be expanded accordingly, and the questionnaire table structure modified to include additional data capture fields.

The connotative judge repeats this procedure for all 500 records in the questionnaire, then returns the completed questionnaire table 84 via the Internet. Thereafter, the judge may receive another questionnaire table 86, or 88 to evaluate. The next questionnaire table received by the connotative judge may contain exactly the same set of records that was just evaluated, but accompanied by a different category list of emotional descriptors to be used for coding. Alternatively, the next questionnaire table may contain a completely different selection of records. The exchange of questionnaire tables continues iteratively for the duration of connotative data collection.

In a preferred embodiment of the invention, each block of 500 records is evaluated in this manner eight times (corresponding to the eight category lists of connotative descriptors listed in Table 2), each time by 24 different connotative judges selected at random from the pool of 100 to 200 available connotative judges, using a judge-selection technique that stratifies sampling to ensure equal representation according to the guidelines summarized in Table 4. Note that the number of judges selected, the size of the pool and the number of records processed in a given questionnaire may vary.

Typically a plurality of panels 82, 83 are formed to evaluate the database 12 records for connotative associations. Different panels 82, 83 receive either the same or different questionnaires 84–89. For the exemplary embodiment where 24 judges evaluate each of 500 records in a given questionnaire, the same 24 judges may or may not evaluate all eight categories of emotional connotations for such 500 records.

Quantifying Intensity of Connotative Meanings

As previously described each judge receives a questionnaire. In one embodiment the questionnaire is in table format. Each record in the table has multiple fields as listed above in Table 5. Fields 1, 2 and 3 are already complete and correspond to the term, a denotative context for such term, aid a part of speech. Field 4 is filled in as described above to identify connotative meaning for the word or phrase. Field 5 is to be filled in to record the intensity associated with the connotative meaning provided in Field 4. When a judge indicates that there is no connotative meaning for the word or phrase or that the judge does not know the term or the specific denotative context, then there is no need to quantify an intensity in Field 5. Where a judge is permitted to provide two connotative meanings (e.g., a primary and a secondary connotative meaning) then additional fields are included for each record in the questionnaire (e.g., two fields corresponding to Field 4 and two fields corresponding to Field 5).

Typically a judge quantifies the intensity of the connotative meaning when selecting the connotative meaning itself. The intensity is a scaled value judgement of the judge. Table 7 lists the ratings scale for one embodiment.

TABLE 7

General Coding Model for Capturing Field 5 Data

| 1 | 2 | 3 | 4 | 5 | 6 | 7 |
|---|---|---|---|---|---|---|
| slightly intense | | | | | | very intense |

0=automatically coded, corresponding to '00' code entry in Field 4
9=automatically coded, corresponding to '99' code entry in Field 4

In a preferred embodiment, a guiding set of anchor terms are included which are prerated for intensity. The judge's review of such guiding set improves consistency and accuracy among many judges completing the questionnaires. Specifically, the anchor terms are terms that are associated with scale numbers that represent the average intensity scores that other people have provided for various terms. Each connotative judge is expected to disagree with some of the scores represented by some of the anchor terms. For this reason, connotative judges are instructed to either, (i) highlight only those anchor terms with which they are comfortable, or (ii) alternatively, cross out those anchor terms with which they are uncomfortable. The connotative judge then compares the term he or she is scaling in the questionnaire table with his or her intensity of feeling associated with the anchored scales, choosing the scale number with the closest match.

The anchor terms are representative averages; they do not imply "correctness," but rather provide the connotative judge with indicators of the relative strength of feeling that the connotative judge associates with the chosen emotional descriptor that is meant to be associated with each score number. In effect the anchor terms serve as a way for the judges to calibrate themselves to a scale of intensity. Table 8 presents a typical list of anchor terms associated with a group of emotional descriptors subsumed under the emotional category 'Sadness,' which is one of the eight emotional categories previously described.

TABLE 8

Anchor Terms for Scaling Intensity of Connotative Feeling for the Emotional Category "Sadness"
(NOTE: the numbers 1 through 12 for the anchor terms are merely for reference purposes.
NO RANK ORDER is implied by the numbering within a scale level.)

SCALE LEVEL 7 (very intense sadness)

| 1. Holocaust - n | the mass murder by the Nazis of the Jews of continental Europe between 1940 and 1945. |
| 2. Auschwitz - n | Polish town, site of a Nazi death camp during World War II. |

TABLE 8-continued

Anchor Terms for Scaling Intensity of Connotative Feeling for the Emotional Category "Sadness"
(NOTE: the numbers 1 through 12 for the anchor terms are merely for reference purposes.
NO RANK ORDER is implied by the numbering within a scale level.)

| 3. child abuse n | physical, sexual, or emotional ill-treatment or neglect of a child by parents or other adults. |
| 4. AIDS - n | acquired immune (or immuno-) deficiency syndrome. |
| 5. rape victim - n | a person who has suffered rape/sexual attack |
| 6. starving person - n | a person whose health is deteriorating from lack of food |
| 7. murder - n | the unlawful premeditated killing of one human being by another |
| 8. cancer - n | malignant growth or tumor; uncontrolled cell division |
| 9. suicide - n | the act or an instance of killing oneself intentionally |
| 10. death - n | the permanent end of all functions of life |
| 11. blind - adj | unable to see; sightless |
| 12. insane - adj | mentally deranged; crazy; of unsound mind |

SCALE LEVEL 6

| 1. slave - n | a person having no freedom and forced to work for another. |
| 2. abused person - n | a person who is maltreated, esp. physically or sexually. |
| 3. leukemia - n | an acute or chronic disease characterized by a gross proliferation of leucocytes; cancer of the blood. |
| 4. abandon - v | to forsake completely; desert; leave behind |
| 5. child pornography - n | sexually explicit writings, pictures, films, etc., of children designed to stimulate sexual excitement. |
| 6. depression - n | a mental disorder characterized by extreme gloom, feelings of inadequacy, and inability to concentrate |
| 7. divorce - n | the dissolution of a marriage by judgment of a court. |
| 8. starve - v | to die or cause to die from lack of food. |
| 9. lonely - adj | unhappy as a result of being without the companionship of others |
| 10. heartless - adj | unkind or cruel; hard-hearted |
| 11. hurt - adj | injured or pained physically or emotionally |
| 12. suicidal - adj | involving, indicating, or tending towards suicide |

SCALE LEVEL 5

| 1. beggar - n | a person who begs, esp. one who lives by begging. |
| 2. sufferer - n | a person who is undergoing pain, punishment, etc. |
| 3. leper - n | a person who has leprosy. |
| 4. victimize - v | to punish or discriminate against selectively or unfairly. |
| 5. lose - v | to be without, as through theft, accident, negligence, etc. |
| 6. degrade - v | to reduce in worth, character, etc.; disgrace; dishonor. |
| 7. desert - v | to leave or abandon, esp. in violation of a duty, promise. |
| 8. deprive - v | to prevent from possessing or enjoying; dispossess (of). |
| 9. alienate - v | to cause to become indifferent, unfriendly, or hostile; estrange. |
| 10. demoralize - v | to undermine the morale of; dishearten. |
| 11. pain - n | emotional, mental, or physical suffering or distress. |
| 12. missing - adj | not able to be traced and not known to be dead. |

SCALE LEVEL 4

| 1. inmate - n | a person confined to an institution such as a prison or hospital. |

TABLE 8-continued

Anchor Terms for Scaling Intensity of Connotative Feeling
for the Emotional Category "Sadness"
(NOTE: the numbers 1 through 12 for the anchor terms are
merely for reference purposes.
NO RANK ORDER is implied by the numbering within a scale level.)

| | | |
|---|---|---|
| 2. | drunkard - n | a person who is frequently or habitually drunk. |
| 3. | addict - n | a person who is addicted, esp. to narcotic drugs. |
| 4. | haunt - v | to intrude upon or recur to (the memory, thoughts, etc.) |
| 5. | condemn - v | to express strong disapproval of; censure. |
| 6. | refuse - v | to decline to accept (something offered). |
| 7. | skid row - n | a dilapidated section of a city inhabited by vagrants, etc. |
| 8. | hopeless - adj | having or offering no hope. |
| 9. | alone - adj | apart from another or others; solitary. |
| 10. | persecuted - adj | oppressed, harassed, or maltreated. |
| 11. | unemployed - adj | without remunerative employment; out of work. |
| 12. | deformed - adj | disfigured or misshapen. |

SCALE LEVEL 3

| | | |
|---|---|---|
| 1. | wino n | a person who habitually drinks wine as a means of getting drunk. |
| 2. | wretch n | a person pitied for their misfortune. |
| 3. | tracks n | needle marks on the skin of an injection drug user. |
| 4. | ostracize v | to exclude or banish (a person) from a particlular group, society. |
| 5. | forsake v | to give up (something valued or enjoyed). |
| 6. | jail n | a place for the confinement of prisoners. |
| 7. | lonely adj | unhappy as a result of being without companionship of others. |
| 8. | hungry adj | experiencing pain, weakness, or nausea through lack of food. |
| 9. | rejected adj | not accepted, acknowledged, used, believed, etc. |
| 10. | pitiful adj | arousing or deserving sympathy or sorrow. |
| 11. | helpless adj | unable to manage independently. |
| 12. | let down adj | unfulfilled in expectations; disappointed. |

SCALE LEVEL 2

| | | |
|---|---|---|
| 1. | drop-out - n | a student who fails to complete a school or college course. |
| 2. | lush - n | a heavy drinker, esp. an alcoholic. |
| 3. | underestimate - v | to think insufficiently highly of. |
| 4. | flophouse - n | a cheap lodging house, esp. one used by tramps. |
| 5. | God Bless the Child - n | a song written by Billie Holiday and Arthur Herzog. |
| 6. | homesick - adj | depressed or melancholy at being away from home and family. |
| 7. | lost - adj | confused, bewildered, or helpless. |
| 8. | empty - adj | without purpose, substance, or value. |
| 9. | heavy hearted - adj | sad; melancholy. |
| 10. | disenchanted - adj | disillusioned. |
| 11. | unlucky - adj | characterized by misfortune or failure. |
| 12. | blue - adj | depressed, moody, or unhappy. |

SCALE LEVEL 1 (slight sadness)

| | | |
|---|---|---|
| 1. | wallflower - n | a person who stays on the fringes of a dance or party. |
| 2. | gambler - n | a person who risks or bets (money) on games, sports, etc. |
| 3. | orphan - n | a child, one or (more commonly) both of whose parents are dead. |
| 4. | runaway - n | a person who takes flight or escapes. |
| 5. | dim - v | to cause to seem less bright, as by comparison. |
| 6. | coal mine - n | a system of excavations made for the extraction of coal. |
| 7. | mobile home - n | living quarters mounted on wheels and capable of being towed. |
| 8. | Monday - n | the second day of the week; first day of the working week. |

TABLE 8-continued

Anchor Terms for Scaling Intensity of Connotative Feeling
for the Emotional Category "Sadness"
(NOTE: the numbers 1 through 12 for the anchor terms are
merely for reference purposes.
NO RANK ORDER is implied by the numbering within a scale level.)

| | | |
|---|---|---|
| 9. | comb-over - n | a hairstyle in which long hair from the fringes of the scalp is arranged to cover and hide a bald portion of the scalp. |
| 10. | colorless - adj | grey or pallid in tone or hue. |
| 11. | indifferent - adj | showing no care or concern; uninterested. |
| 12. | resigned - adj | acquiescent or submissive. |

A judge looks at each anchor term for a given rating in a given emotional category of the categories listed in Table 2. The judge selects one or more anchor terms under a given rating for a given emotional category which the judge feels most closely relates to the intensity rating subjectively felt by the judge.

In a preferred embodiment, the anchor terms are updated over time based upon many judges' response entries into Field 5 for each record. In particular the Field 4 and 5 entries are analyzed to identify terms which consistently are judged by many different judges to have the same connotative meaning and the same intensity. Such terms become reliable anchor terms. This is done on an ongoing basis in order to build up a large, reliable database of anchor terms.

As indicated above, an 8-point scale (including zero, indicating absence of the specified connotative feeling) is used to capture data for Field 5 in a preferred embodiment of the invention. However anchored scales of smaller or larger size, such a 3, 5, or 9 point scales may be used. Also, the number of anchor words or phrases may be greater than the 12 used in the preferred method, or fewer than 12. The number of anchor terms should be large enough to allow a choice permitting the connotative judge to select only those with which he or she is comfortable.

The connotative judge repeats the above steps to input data for Fields 4 and 5 for all records in the questionnaire, then returns the completed questionnaire table via the Internet, then receives another questionnaire table to evaluate. The next questionnaire table received by the connotative judge may contain exactly the same set of terms that was just evaluated, but accompanied by a different list of emotional descriptors to be used for coding Field 4, and a correspondingly different set of anchors for coding Field 5. Alternatively, the next questionnaire table may contain a completely different selection of terms, with a corresponding emotional descriptor list for Field 4 and an anchor term list for Field 5. The exchange of questionnaire tables continues iteratively for the duration of connotative data collection.

In a preferred embodiment of the invention, each block of 500 records is evaluated in this manner eight times, corresponding to eight emotional categories, each time by 24 different connotative judges. In this manner, a full-language dictionary database in any language, associating every context of every word with a very broad range of identified emotional connotations and their individual intensity levels, is constructed.

Data Integrity

Comparatively analyzing the connotative data associated with each block of records being processed serves to check for data integrity. Checking the data for integrity is part of an automated questionnaire processing function 90 (see FIG. 8). An initial integrity processing step is to determine whether any of the 24 sets of data should be rejected as invalid because of anomalous data. This is accomplished by statistically comparing the score set of each individual judge with the combined score sets of the other 23 judges who evaluated the same set of words using the same lists of emotional descriptors. If the scores between any given judge's data and the aggregate data of the other judges in the panel are not statistically related, then the data set for the anomalous judge is rejected. Anomalous data may arise if, for example, a connotative judge is filling in random data to avoid the mental work involved in providing genuine connotative data, or if a judge is coding a large number of double zeros and ninety-nines, or if a judge's experience is so far out of the mainstream that his or her connotative associations are not representative of the larger population. In a preferred method of practicing the invention, a minimum correlation level of 0.6 is used as a data rejection threshold.

Further analysis includes determining how many valid non-zero scores remain after purging invalid scores and after accounting for 00 and 99 scores. A determination is then made to ascertain which emotional connotations the judges most often associate with each word or phrase. This is a function of four factors:

1. The number of valid scores remaining after data purging;
2. The number of emotional connotative descriptors in the list the judges had to choose from;
3. The number of judges who selected the same emotional descriptor; and
4. The probability that the same emotional descriptor was selected by more than one judge merely by chance.

The multinomial probability distribution below in equation (I) embodies the above factors:

$$P(y) = \frac{n!}{y!(n-y)!} * p^y q^{n-y} \tag{I}$$

where:

n is the total number of independent connotative judges evaluating the record;

y is the number of judges selecting a particular emotional descriptor;

p is the probability of the emotional descriptor being selected if the selection occurs by chance;

q is the probability of an emotional descriptor being excluded if the selection occurs by chance; and P(y) is the probability of the emotional descriptor being selected by y judges if the selections occurred by chance.

Tables may be constructed of the probabilities P(y) of connotative judges independently selecting the same emotional descriptors by chance for various panel sizes (e.g., increasing incrementally up to 24, and/or additional panel sizes of 36, 72, 96, 120 or any other panel size), and emotional connotative descriptors available for selection (e.g., increasing incrementally up to 24, with additional category group sizes of 36, 72, 96, 120 or any other corresponding descriptor group size).

As an example, consider the following set of connotative judgments for one word evaluated by 24 connotative judges on the Amusement/Excitement emotional category, which subsumes 16 emotional descriptors. The total number of valid judgments after purging is 21 (Table 9).

TABLE 9

Example of Field 4 and 5 Questionnaire Table Scores

| Emotional Descriptors | Field 4 "Votes" Received from Connotative Judges | Field 5 Intensity Scores |
|---|---|---|
| Amazement | 0 | |
| Amusement | 3 | 5, 3, 5 |
| Astonishment | 0 | |
| Eagerness | 2 | 5, 4 |
| Enthusiasm | 0 | |
| Excitement | 1 | 4 |
| Exhilaration | 1 | 5 |
| Exuberance | 1 | 4 |
| Fun | 0 | |
| Glee | 5 | 3, 4, 6, 4, 4 |
| Hilarity | 3 | 4, 4, 5 |
| Merriment | 1 | 5 |
| Mirth | 3 | 6, 4, 5 |
| Surprise | 0 | |
| Thrill | 1 | 4 |
| Wonder | 0 | |

The associated probabilities of chance selection of the same emotional descriptor by independent connotative judges, according to equation (I), are as follows:

| Number of Judges Selecting the Same Category | Probability of Chance Selection |
|---|---|
| 0 | 0.258 |
| 1 | 0.361 |
| 2 | 0.241 |
| 3 | 0.102 |
| 4 | 0.030 |
| 5 | 0.007 |

In this example, only one emotional descriptor, "Glee," has been selected by enough independent connotative judges (5 judges) to meet the test of statistical significance, and is retained in the main database 12 as a connotative association for the term being evaluated. For any given term, selection of emotional descriptors from one emotional category does not preclude selection of emotional descriptors from other emotional categories. Any given term is apt to evoke several kinds of emotional response simultaneously. Therefore, the same term is also evaluated in an identical manner on the other seven categories of emotional connotations listed in Table 2. Thus, the term may, or may not, finish with more connotative emotional descriptors added when the data collection procedure has been completed.

In a preferred embodiment of the invention, terms that receive no votes from the connotative judges on any of the connotative groupings, or too few votes on all eight connotative groupings to meet the test of statistical significance, are tagged as "non-connotative," so that such terms may be optionally excluded from further analysis or database querying.

As for connotative intensity, all 21 scores in the above example are valid, not just the 5 scores for the specific emotional descriptor "Glee," because the 21 Field-5 scores represent the general emotional category, "Amusement/Excitement," which subsumes the specific emotional descriptor, "Glee."

By completion of data analysis, each of the eight emotional variables contains one mean (i.e., average) intensity score for each word or phrase. An unbiased estimate of the variance of the sample of 21 anchored intensity scores in Table 9 is calculated according to the following variance formula:

$$s^2 = \frac{\sum (X - \overline{X})^2}{(n-1)}$$

from which the standard error of the mean for the sample is estimated in accordance with the following formula:

$$s_{\overline{X}} = \frac{s}{\sqrt{n}}$$

where:
  X is an independent connotative judge's score
  $\overline{X}$ is the sample mean
  n is the number of scores in the sample
  $s^2$ is an unbiased estimate of the variance of the sample
  s is the sample standard deviation
  $s_{\overline{X}}$ is the standard error of the mean.

In the present example, the average of the 21-score sample of Field-5 data presented in Table 9 is 4.4. The standard deviation of the 21-score sample is approximately 0.81, which, when divided by 21 yields a standard error of the mean of about 0.177, for a 95% confidence level about the mean of ±0.35. Further accuracy is obtained by programming the computer to identify and purge "outlier" scores. This is accomplished by comparing each score with the mean and purging scores that are higher or lower than a specified distance from the mean.

In a preferred embodiment of the invention, terms that receive no Field-4 emotional descriptor votes from the connotative judges on any of the eight emotional categories (and therefore no Field-5 intensity scores) are tagged as "non-connotative," so that, at the user's option, such terms may be excluded from further analysis or database querying.

Identifying Human Interest Area Relating to a Record

The Human Interest fields 48 may be defined in the same manner as the Field 4 data of Table 5. However, because the human interest fields are less subjective and relate more directly to denotative context, in a preferred embodiment assigned editors are used to define most of the human interest fields. However several variables on the Table 3 list of human interest fields, such as the miscellaneous fields for "Abstract-Concrete," "Power," and "Activity" are better left to evaluation by panels of connotative judges. These fields are defined as described above for the field 4 data and are subject to the same or similar data integrity procedures.

A preferred embodiment of the invention such as the one described herein is both human-judgment based and dynamic, reflecting the human and dynamic nature of language. Since the data provided by the connotative judges are key to the system and method, one may wish to establish a program of continuous update of the database, either at prescribed intervals or on an ongoing basis, such as through a World Wide Web site. In this way, connotative judges would be able to supply data continuously, with turnover of connotative judges easily managed, and the database, particularly the connotative component, kept completely up to date allowing for new or changing connotative associations.

In one embodiment participating judges periodically or aperiodically receive a mini-database via e-mail or by logging onto a web site. The mini-database serves as the questionnaire allowing the judge to enter a code for the connotative association (see table 6) for a given emotional category (see table 2). The results are then processed as described above for data integrity (see questionnaire processing 90 of FIG. 8 and related description).

By practicing the above method and system of the present invention, a complete and accurate connotative language reference database 12 is constructed in any language, which then can be used to construct interactive connotative language reference tools, such as connotative dictionaries, connotative thesauruses, and connotative text analysis tools.

Meritorious and Advantageous Effects

One advantage of the system for identifying connotative meanings is that reliable associations, including connotative descriptions and intensities, are identified for given terms in each of their denotative contexts. Another advantage is that the associations are maintained over time with changes in the vernacular or other changes/occurrences affecting connotative association.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for quantifying intensity of connotative meaning of a plurality of data records, each record respectively corresponding to a term and a corresponding denotative context for said term, the method comprising the steps of:
  evaluating, multiple times, each one record of the plurality of records for a connotative association with each one of a plurality of predefined emotional descriptors within each one of a plurality of predefined emotional categories to achieve multiple samples of connotative association data for said each one record, wherein for each one record where a connotative association is made, an intensity rating also is determined;
  identifying any statistically significant connotative associations for each one record of the plurality of records based upon said multiple samples of connotative association data, wherein the identified statistically significant connotative associations are said identified connotative meanings.

2. The method of claim 1, further comprising the steps of:
  forming a list of anchor terms which serve as a reference for a given intensity rating of emotional descriptors within a given emotional category of said plurality of predefined emotional categories.

3. The method of claim 1, in which the step of evaluating comprises the steps of:
  displaying said one record of the plurality of records at a first display device;
  selecting either one of no connotative association or a primary connotative association for the displayed record from a predefined set of emotional descriptors within a first emotional category of said plurality of emotional categories;
  where a primary connotative association is selected, quantifying an intensity for such primary connotative association;
  repeating the steps of displaying, selecting, and quantifying for other records among the plurality of records.

4. The method of claim 1, wherein the step of evaluating comprises the steps of:
  selecting a first plurality of connotative judges to evaluate a first set of records among said plurality of records for a connotative association with a plurality of emotional descriptors from a first category of the plurality of emotional categories to achieve a sample of connotative association data and corresponding intensity data for said first category for each record among said first set of records; and selecting a second plurality of connotative judges to evaluate a second set of records among said plurality of records for a connotative association with a plurality of emotional descriptors from a second category of the plurality of emotional categories to achieve a sample of connotative association data and corresponding intensity data for said second category for each record among said second set of records.

5. The method of claim 4, wherein the first plurality of connotative judges is the same as the second plurality of connotative judges, wherein said first set of records is the same as said second set of records, and wherein said first emotional category is different from said second emotional category.

6. The method of claim 4, wherein the first plurality of connotative judges is the same as the second plurality of connotative judges, wherein said first set of records is different from said second set of records, and wherein said first emotional category is the same as said second emotional category.

7. A method for quantifying intensity of connotative meaning of a plurality of data records, each record respectively corresponding to a term and a corresponding denotative context for said term, the method comprising the steps of:

selecting a first plurality of connotative judges to receive a first plurality of questionnaires, each one questionnaire among the first plurality of questionnaires including a first set of records from the plurality of records, a set of emotional descriptors corresponding to one of a plurality of emotional categories, a set of anchor terms for each one rating among a scale of ratings corresponding to said one of the plurality of emotional categories;

for a first questionnaire of said first plurality of questionnaires, in which the set of emotional descriptors is associated with a first emotional category of said plurality of emotional categories, choosing an anchor term from the set of anchor terms for each one rating for the first emotional category, displaying one record of the first set of records at a first display device accessible to one of the first plurality of connotative judges, selecting either one of no connotative association or a primary connotative association for the displayed record from said first emotional category of emotional descriptors, where a primary connotative association is selected quantifying an intensity for the selected primary connotative association by selecting an intensity rating, and repeating the steps of displaying, selecting and quantifying for other records among the first set of records;

for a second questionnaire of said first plurality of questionnaires, in which the set of emotional descriptors is associated with a second emotional category of said plurality of emotional categories, choosing an anchor term from the set of anchor terms for each one rating for the second emotional category, displaying one record of the second set of records at the first display device, selecting either one of no connotative association or a primary connotative association for the displayed record from said second emotional category of emotional descriptors, where a primary connotative association is selected quantifying an intensity for the selected primary connotative association by selecting an intensity rating, and repeating the steps of displaying, selecting and quantifying for the second questionnaire for the other records among the first set of records.

8. The method of claim 7, further comprising the step of:

selecting a second plurality of connotative judges to receive a second plurality of questionnaires, each one questionnaire among the second plurality of questionnaires including a second set of records from the plurality of records, a set of emotional descriptors corresponding to another one of the plurality of emotional categories, a set of anchor terms for each one rating among a scale of ratings corresponding to said another one of said plurality of emotional categories.

9. A method for quantifying intensity of connotative meaning of a plurality of data records, each record respectively corresponding to a term and a specific denotative context for said term, the method comprising the steps of:

displaying one record of the plurality of records;

selecting a connotative association for the displayed record from a predefined set of emotional descriptors within a given emotional category;

quantifying intensity of the connotative association by selecting an intensity rating for the selected connotative association from a range of intensity ratings;

repeating the steps of displaying, selecting and quantifying for other records among the plurality of records;

choosing an anchor term from a set of anchor terms which subjectively corresponds to a given rating among the range of intensity ratings, wherein there is a unique set of anchor terms for each rating among the range of intensity ratings for the given emotional category.

10. The method of claim 9, further comprising the step of:

selecting a plurality of connotative judges, in which the connotative judges cumulatively evaluate the plurality of records for a connotative association and intensity to achieve multiple samples of connotative association data and corresponding intensity for said each record of said plurality of records.

11. The method of claim 10, further comprising the step of:

identifying any statistically significant connotative associations for each one record of the plurality of records based upon said multiple samples of connotative association data;

identifying an intensity rating for each statistically significant connotative associations based on the selected intensities for such connotative association during the quantifying step.

12. The method of claim 11, wherein said set of anchor terms for a given rating of a given emotional category is updated over time by analyzing the identified statistically significant connotative associations and the corresponding identified intensity ratings.

13. A system for identifying connotative meaning and corresponding intensity of connotative meaning of a plurality of data records, each record corresponding to either one of a specific word or phrase and a specific denotative context for said one specific word or phrase, the system comprising:

means for gathering multiple samples of connotative association data for each one record of said plurality of records, said gathering means comprising a list emotional descriptors;

means for identifying any statistically significant connotative associations for each one record of the plurality of records based upon said multiple samples of connotative association data, wherein the identified statistically significant connotative associations are said identified connotative meanings; and means for identifying an intensity rating for each identified statistically significant connotative association.

14. The system of claim 13, in which said gathering means comprises a plurality of questionnaires, each one questionnaire encompassing a set of records from said plurality of records and allowing selection of no more than two emotional descriptors for any given record of said set of records and selection of an intensity rating for each selected emotional descriptor, each one questionnaire including a set of anchor terms for each one rating among the range of intensity ratings, wherein at least one anchor term is selected for each one rating.

15. The system of claim 14, wherein each one questionnaire includes emotional descriptors from within not more than one emotional category, and wherein the set of anchors for each one rating corresponds to the given emotional category.

16. The system of claim 14, in which the gathering means comprises:

a display at which a given questionnaires is displayed; and an input device for receiving a selection of either one of no connotative association or a primary connotative association for a displayed record from said list of emotional descriptors and a selection of the intensity rating where there is a selection of the primary connotative association.

17. The system of claim 14, in which the gathering means further comprises means for routing a first questionnaire among the plurality of questionnaires to a computer of a screened connotative judge.

* * * * *